Patented Sept. 1, 1925.

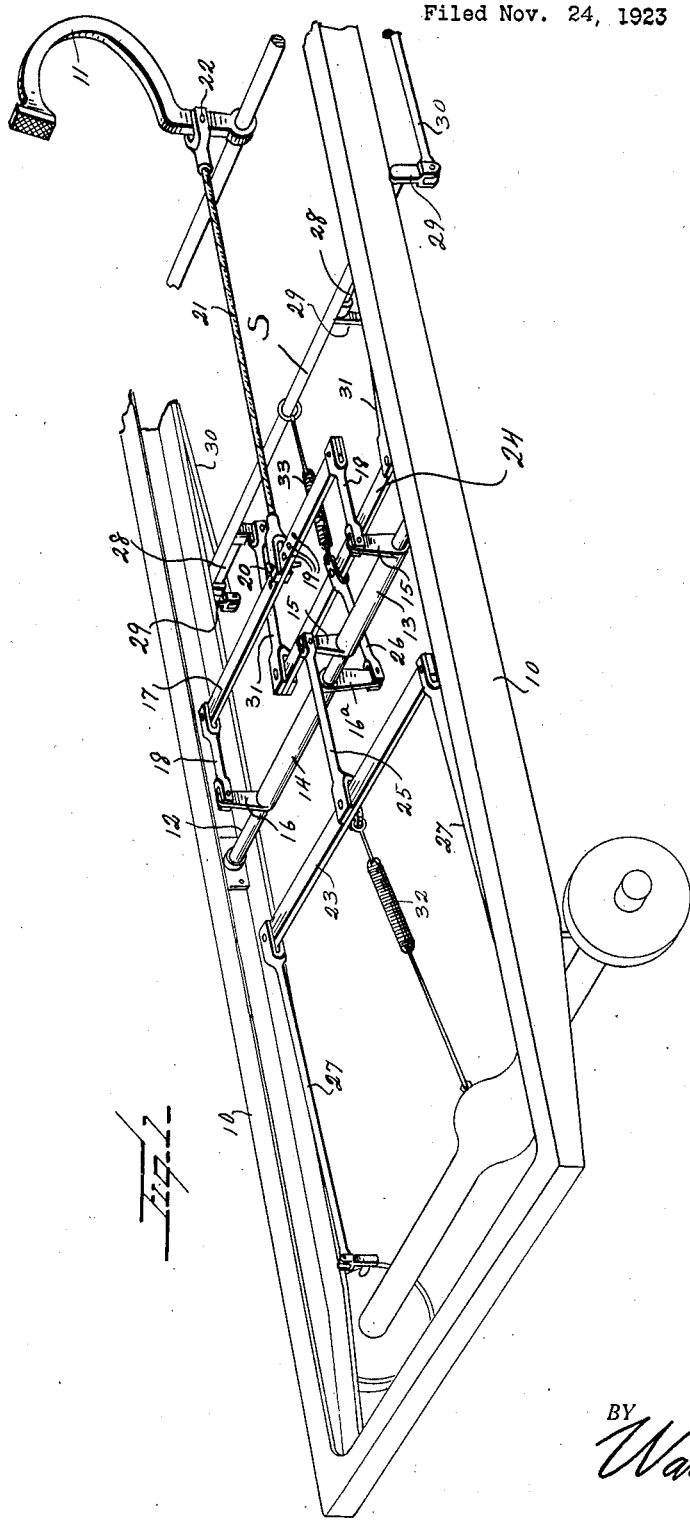

1,551,640

UNITED STATES PATENT OFFICE.

LOUIS N. BUTLER, OF CEDAR FALLS, IOWA.

BRAKE EQUALIZER.

Application filed November 24, 1923. Serial No. 676,800.

*To all whom it may concern:*

Be it known that I, LOUIS N. BUTLER, a citizen of the United States, residing at Cedar Falls, in the county of Black Hawk and State of Iowa, have invented certain new and useful Improvements in Brake Equalizers, of which the following is a specification, reference being had to the accompanying drawings.

This invention relates to brake equalizers and has for an important object thereof the provision of an equalizer, for disposition between the brake and operating control member therefor, which is capable of equalizing the pressure from the operating member which is brought to bear upon each of the four brakes employed in four-wheel brake systems.

A further object of the invention is to provide a device of this character which may be very simply constructed and is readily applied to the vehicle, being so positioned that it will not interfere with the operating mechanism of the vehicle.

A further object of the invention is to provide a device of this character which is simple in its construction and arrangement, durable in service and a general improvement in the art.

These and other objects I attain by the construction shown in the accompanying drawings, wherein for the purpose of illustration is shown a preferred embodiment of my invention and wherein:—

Figure 1 is a perspective view showing brake mechanism constructed in accordance with my invention; and Figure 2 is a transverse sectional view through the frame showing the manner of mounting the front brake operating rods.

Referring now more particularly to the drawings, the numeral 10 indicates the side frame members of a vehicle chassis and 11 the usual pivoted brake pedal controlling the brakes of the vehicle. Rearwardly of the brake pedal and preferably at a point adjacent the rear axle I provide a stationary shaft 12 extending transversely of the chassis and secured to the side frame members 10 thereof. Upon this shaft are mounted a pair of sleeves 13 and 14, the sleeve 13 having a pair of similarly directed arms 15 while the sleeve 14 is provided with a pair of oppositely directed arms 16 and 16ª, the arm 16 thereof extending in the same general direction as the arms 15 of the sleeve 13.

The numeral 17 designates a primary equalizer bar, the ends of which are connected through links 18 with the arm 16 of the sleeve 14 and with one of the arms 15 of the sleeve 13. The equalizer bar is provided centrally with a row of openings 19 selectively receiving a securing element 20 by means of which one end of a flexible member 21 is secured to the equalizer bar, the opposite end of the flexible element being clamped to the oscillating foot pedal 11, as at 22. The arrangement of the openings 19 is preferably such that a greater pressure may be brought to bear upon that end of the bar connected with the arm 15 of the sleeve 13, this in the present instance being accomplished by placing the series of openings slightly nearer the end of the equalizer bar which is connected with the arm 15.

Arranged upon opposite sides of the shaft 12 and extending transversely of the frame paralleling the shaft are secondary equalizer bars 23 and 24. The secondary equalizer bar 23, which is arranged rearwardly of the shaft 12 and between the shaft and the rear axle, is connected centrally by a link 25 with the second arm 15 of the sleeve 13. The secondary equalizer bar 24, which is arranged forwardly of the shaft 12, is connected by a link 26 with the arm 16ª of the sleeve 14. The arms 15 and 16 being similarly directed and the arm 16ª being oppositely directed from the arms 15 and 16, it follows that upon movement of the primary equalizer bar 17 forwardly, as will be the result when the pedal is depressed to actuate the brakes, both secondary equalizer bars 23 and 24 will be shifted toward the shaft 12 and accordingly will move away from their respective rear or front brakes. The ends of the secondary equalizer bar 23 are provided with links 27 for attachment to the rear brakes. Immediately forward of the secondary equalizer bar 24 a transverse support S connects the side members 10 and has mounted thereon a pair of rock shafts 28, each provided with a pair of similarly extending arms 29, one of which is arranged outwardly of the frame and connected with a front brake (not shown), by means of a link 30 or the like. To the remaining arms of the rock shafts 28 the ends of the equalizer bar 24 are connected by links 31. In order that release of the brakes may be accomplished I connect the secondary equalizer bar 23 with the rear axle by a spring 32 extending between the point of attachment of the link 25 to the secondary equalizer bar 23 and the axle. Similarly, a spring 33 connects the transverse support upon which the shafts 28 are mounted and the secondary equalizer bar 24.

It will be seen that by the use of apparatus constructed in accordance with my invention an equal distribution of pressure between the brakes of the vehicle is assured. It will also be noted that since the flexible element 21 connecting the primary equalizer bar and the braking pedal is connected with this bar more nearly adjacent that end which is connected to the arm 15, greater pressure will be brought to bear upon the arm 15 than is brought to bear upon the arm 16 so that greater pressure will be applied to the rear brakes than to the front brakes, the difference in these pressures being determined by the opening with which the pivot 20 is engaged. The structure hereinbefore set forth being capable of many changes and modifications without in any manner departing from the spirit of my invention, I accordingly do not wish to be understood as limiting myself to such specific structure except as hereinafter claimed.

I claim:—

1. In four-wheel brake mechanism and in combination with the usual vehicle frame and brake lever mounted thereon, a shaft extending transversely of the frame rearwardly of the lever, a pair of sleeves rotatably mounted upon said shaft, a connection between each of said sleeves and the brake lever including an equalizer, a pair of equalizers arranged upon opposite sides of said shaft and adapted for connection with the wheel brakes at corresponding ends of the frame, and connections between said sleeves and the last named equalizers shifting the equalizers toward the shaft upon operation of the brake lever.

2. In four-wheel brake mechanism and in combination with the usual vehicle frame and brake lever mounted thereon, a shaft extending transversely of the frame rearwardly of the lever, a pair of sleeves rotatably mounted upon said shaft, a connection between each of said sleeves and the brake lever including an equalizer, a pair of equalizers arranged upon opposite sides of said shaft and adapted for connection with the wheel brakes at corresponding ends of the frame, connections between said sleeves and the last named equalizers shifting the equalizers toward the shaft upon operation of the brake lever, including oppositely extending arms on said sleeves, a connection between the arm of one sleeve and one of the equalizers, and a connection between the arm of the other sleeve and the other of the equalizers.

3. In four-wheel brake mechanism and in combination with the usual vehicle frame and brake lever mounted thereon, a shaft extending transversely of the frame rearwardly of the lever, a pair of sleeves rotatably mounted upon said shaft, a connection between each of said sleeves and the brake lever including a primary equalizer, a pair of secondary equalizers arranged upon opposite sides of said shaft and adapted for connection with the wheel brakes at corresponding ends of the frame, and connections between said sleeves and the secondary equalizers shifting the secondary equalizers toward the shaft upon operation of the brake lever, the connection between the primary equalizer and the brake lever being adjustable longitudinally of the primary equalizer.

4. In four-wheel brake mechanism for vehicles and in combination with a vehicle frame and usual brake lever carried thereby, a shaft extending transversely of the frame, a pair of sleeves mounted upon said shaft, a support extending transversely of the frame forwardly of the shaft, one of said sleeves embodying a pair of similarly directed arms, the other of said sleeves embodying a pair of oppositely directed arms, a secondary brake equalizer arranged rearwardly of the shaft, a second secondary equalizer arranged intermediate the shaft and support, a connection between the first named secondary equalizer and the inner arm of one of said sleeves, a connection between the inner arm of the other of the sleeves and the other of said secondary equalizers, means for connecting the ends of the first named secondary equalizer to brakes disposed rearwardly thereof, and means for connecting the other of the secondary equalizers to brakes disposed forwardly thereof including a pair of rock arms carried by said support and each provided with a pair of similarly disposed arms one of which is disposed outwardly of the frame, connections between the other arms of the rock shaft and the ends of the last named equalizer, and a connection between the sleeves of the first named shaft and the brake lever including a primary equalizer.

5. In four-wheel brake mechanism for vehicles and in combination with a vehicle frame and usual brake lever carried thereby, a shaft extending transversely of the frame, a pair of sleeves mounted upon said shaft, a support extending transversely of the frame forwardly of the shaft, one of said sleeves embodying a pair of similarly directed arms, the other of said sleeves embodying a pair of oppositely directed arms, a secondary brake equalizer arranged rearwardly of the shaft, a second secondary equalizer arranged intermediate the shaft and support, a connection between the first named secondary equalizer and the inner arm of one of said sleeves, a connection between the inner arm of the other of the sleeves and the other of said secondary equalizers, means for connecting the ends of the first named secondary equalizer to brakes disposed rearwardly thereof, means for connecting the other of the secondary equalizers to brakes disposed forwardly thereof including a pair of rock arms carried by said support and each provided with a pair of similarly disposed arms one of which is disposed outwardly of the frame, connections between the other arms of the rock shaft and the ends of the last named secondary equalizer, a connection between the sleeves of the first named shaft and the brake lever including a primary equalizer, and means normally urging the secondary equalizers away from the first named shaft.

In testimony whereof I hereunto affix my signature.

LOUIS N. BUTLER.